United States Patent
Shamoto

(10) Patent No.: US 11,637,522 B2
(45) Date of Patent: Apr. 25, 2023

(54) DRIVE DEVICE

(71) Applicant: TOYOTA JIDOSHA KABUSHIKI KAISHA, Aichi-ken (JP)

(72) Inventor: Yoshihiro Shamoto, Aichi-ken (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/578,478

(22) Filed: Jan. 19, 2022

(65) Prior Publication Data

US 2022/0231628 A1 Jul. 21, 2022

(30) Foreign Application Priority Data

Jan. 21, 2021 (JP) .............................. JP2021-008328

(51) Int. Cl.
*H02P 27/08* (2006.01)
*H02M 7/5395* (2006.01)

(52) U.S. Cl.
CPC .......... *H02P 27/08* (2013.01); *H02M 7/5395* (2013.01); *H02P 2201/09* (2013.01)

(58) Field of Classification Search
CPC .. H02M 7/5395; H02P 27/08; H02P 21/0021; H02P 27/085; H02P 2201/09
See application file for complete search history.

(56) References Cited

U.S. PATENT DOCUMENTS

| | | | |
|---|---|---|---|
| 8,818,596 B2 * | 8/2014 | Asami | B60L 50/51 701/22 |
| 2019/0248248 A1 * | 8/2019 | Shamoto | B60L 15/08 |
| 2020/0287496 A1 | 9/2020 | Shamoto et al. | |
| 2021/0359635 A1 | 11/2021 | Shamoto et al. | |

FOREIGN PATENT DOCUMENTS

| | | |
|---|---|---|
| JP | 2019146281 A | 8/2019 |
| JP | 2020145795 A | 9/2020 |

* cited by examiner

*Primary Examiner* — Said Bouziane
(74) *Attorney, Agent, or Firm* — Hauptman Ham, LLP

(57) ABSTRACT

The first square wave control mode using the square wave pulse pattern is used when the voltage acting on the inverter is equal to or higher than the threshold voltage. On the other hand, when the voltage acting on the inverter is lower than the threshold voltage, a square wave pulse pattern is used when the rotation speed of the motor is equal to or higher than the first predetermined rotation speed that is higher than the first resonance region, and the second square wave control mode using the first switching pattern for suppressing the LC resonance in the first resonance region is used when the rotation speed of the motor is lower than the first predetermined rotation speed.

5 Claims, 7 Drawing Sheets

DRIVE DEVICE

CROSS-REFERENCE TO RELATED APPLICATIONS

The present disclosure claims priority to Japanese Patent Application No. 2021-008328 filed Jan. 21, 2021, which is incorporated herein by reference in its entirety including specification, drawings and claims.

TECHNICAL FIELD

The present disclosure relates to a drive device.

BACKGROUND

Conventionally, as a drive device of this type, in a case switching control is performed on a switching element of an inverter for driving a motor by switching between a pulse-width modulation mode and a square wave control according to a modulation percentage, when the switching control is performed by the square wave control, there has been proposed a device for performing switching control using a first switching pattern and a second switching pattern. The first switching pattern suppresses resonance in a first resonance region when the rotation speed of the motor is equal to or higher than a first predetermined rotation speed that is lower than the first resonance region. The second switching pattern suppresses resonance in a second resonance region that is lower than the first predetermined rotation speed when the rotation speed of the motor is lower than the first predetermined rotation speed (as described in, for example, JP 2019-146281A). Here, the first switching pattern, when the pulse pattern in which a first half cycle or a latter half cycle of one cycle is a square wave pulse as a square wave pulse pattern, forms one or more slits in a region where the square wave pulse exists, forms a short pulse having a same width as the slit at a same timing as the slit in a region where no square wave pulse exists, and suppresses a LC resonance in the first resonance region. The second switching pattern is a pattern in which a number of slits and a number of short pulses is larger than the first switching pattern. The second switching pattern suppresses the LC resonance in the second resonance region.

Further, it has been proposed that the number of slits or short pulse width of the first switching pattern is gradually reduced when switching from the first switching pattern to the square wave pulse (as described in, for example, JP 2020-145795A).

SUMMARY

In some cases, however, in the square wave control of the above-described drive device, when switching from the switching pattern that suppresses the LC resonance in the resonance region to the square wave pulse pattern, even if the number of slits or short pulse width of the switching pattern is gradually reduced, the number of slits or short pulse width cannot be equal to or less than a dead time, a voltage step corresponding to the dead time width is generated, thereby a torque fluctuation may occur.

A drive device of the present disclosure mainly aims to suppress torque fluctuation that may occur when switching from a switching pattern that suppresses the LC resonance in the resonance region to a square wave pulse pattern in the square wave control.

In order to achieve the above primary object, the drive device of the present disclosure employs the following configuration.

The present disclosure is directed to a drive device, including an electricity storage device; a motor; an inverter that drives the motor; a booster converter being installed between the electricity storage device and the inverter; and a controller that performs switching control on a switching element of the inverter and controls the booster converter. For the switching control on the switching element of the inverter, the controller is programmed to switch between a pulse-width modulation control mode and a first square wave control mode according to a modulation percentage when the booster converter is controlled such that a voltage acting on the inverter becomes equal to or higher than a threshold voltage that is based on an electricity from the electricity storage device. The controller is programmed to switch between the pulse-width modulation control mode and a second square wave control mode according to a modulation percentage when the booster converter is controlled such that a voltage acting on the inverter becomes lower than the threshold voltage. The first square wave control mode is a mode using a square wave pulse pattern in which a first half cycle or a latter half cycle of each cycle is a square wave pulse. The second square wave control mode is a mode using the square wave pulse pattern when a rotation speed of the motor is equal to or higher than a first predetermined rotation speed that is higher than a first resonance region. The second square wave control mode is a mode using a first switching pattern when a rotation speed of the motor is lower than the first predetermined rotation speed. The first switching pattern forms one or more slits in a region where a square wave pulse in the square wave pulse pattern exists. The first switching pattern forms a short pulse having a same width as the slit at a same timing as the slit in a region where no square wave pulse exists. The first switching pattern suppresses a LC resonance in the first resonance region.

The drive device of the present disclosure includes an electricity storage device, a motor, an inverter for driving the motor, a booster converter being installed between the electricity storage device and the inverter and a controller that performs switching control on a switching element of the inverter and controls the booster converter. For the switching control on the switching element of the inverter, the controller switches between a pulse-width modulation control mode and a first square wave control mode according to a modulation percentage when the booster converter is controlled such that a voltage acting on the inverter becomes equal to or higher than a threshold voltage that is based on an electricity from the electricity storage device. The first square wave control mode is a mode using a square wave pulse pattern in which a first half cycle or a latter half cycle of one cycle is a square wave pulse. Further, the controller switches between the pulse-width modulation control mode and a second square wave control mode according to a modulation percentage when the booster converter is controlled such that a voltage acting on the inverter becomes lower than the threshold voltage. The second square wave control mode is a mode using the square wave pulse pattern when a rotation speed of the motor is equal to or higher than a first predetermined rotation speed that is higher than a first resonance region. The second square wave control mode is a mode using a first switching pattern when a rotation speed of the motor is lower than the first predetermined rotation speed. The first switching pattern forms one or more slits in a region where a square wave pulse in the square wave pulse pattern exists, forms a short pulse having a same width as the slit at a same timing as the slit in a region where no square wave pulse exists, and suppresses a LC resonance in the first resonance region. The current from the electricity storage device is calculated as the current flowing through the inverter (load current) multiplied by a transfer function, and the transfer function can be obtained as the product of the transfer function of a circuit and the transfer function of a booster converter control. Since the transfer function of the booster converter control can adjust its characteristics by adjusting a gain (duty) of the booster converter control, the LC resonance can be avoided by adjusting the gain(duty) such that a cut-off frequency of the transfer function of the booster converter control becomes smaller than a LC resonance frequency. Accordingly, as the threshold voltage, a voltage equal to or higher than the voltage acting on the inverter when the gain is adjusted such that the cut-off frequency of the transfer function of the booster converter control becomes smaller than the LC resonance frequency can be used. Therefore, it is possible to avoid the occurrence of LC resonance in the first resonance region even when the square wave pulse pattern is used during control of the booster converter such that the voltage acting on the inverter is equal to or higher than the threshold voltage. Further, since the square wave pulse pattern is used instead of using the first switching pattern when controlling the booster converter such that the voltage acting on the inverter is equal to or higher than the threshold voltage, switching from the first switching pattern to the square wave pulse pattern does not occur. As a result, it is possible to avoid torque fluctuation that may occur when switching from the first switching pattern to the square wave pulse pattern. The first switching pattern is used when controlling the booster converter such that the voltage acting on the inverter is less than the threshold voltage. Although the torque fluctuation occurs when switching from the first switching pattern to the square wave pulse pattern, the LC resonance in the first resonance region can be suppressed. As a result, as a whole, it is possible to suppress the torque fluctuation that may occur when switching from the first switching pattern that suppresses the LC resonance in the resonance region to the square wave pulse pattern in the square wave control. In particular, the switching from the first switching pattern to the square wave pulse pattern occurs only when the voltage acting on the inverter is less than the threshold voltage that is based on the current from the power electricity storage device. The switching from the first switching pattern to the square wave pulse pattern occurs only when the voltage step corresponding to the dead time width is small, thereby the torque fluctuation can be reduced. The threshold voltage is a voltage based on the current from the electricity storage device as the threshold voltage varies depending on the current input and output to the power electricity storage device, particularly the discharge current and the charging current.

DESCRIPTION OF EMBODIMENTS

Figure 1:
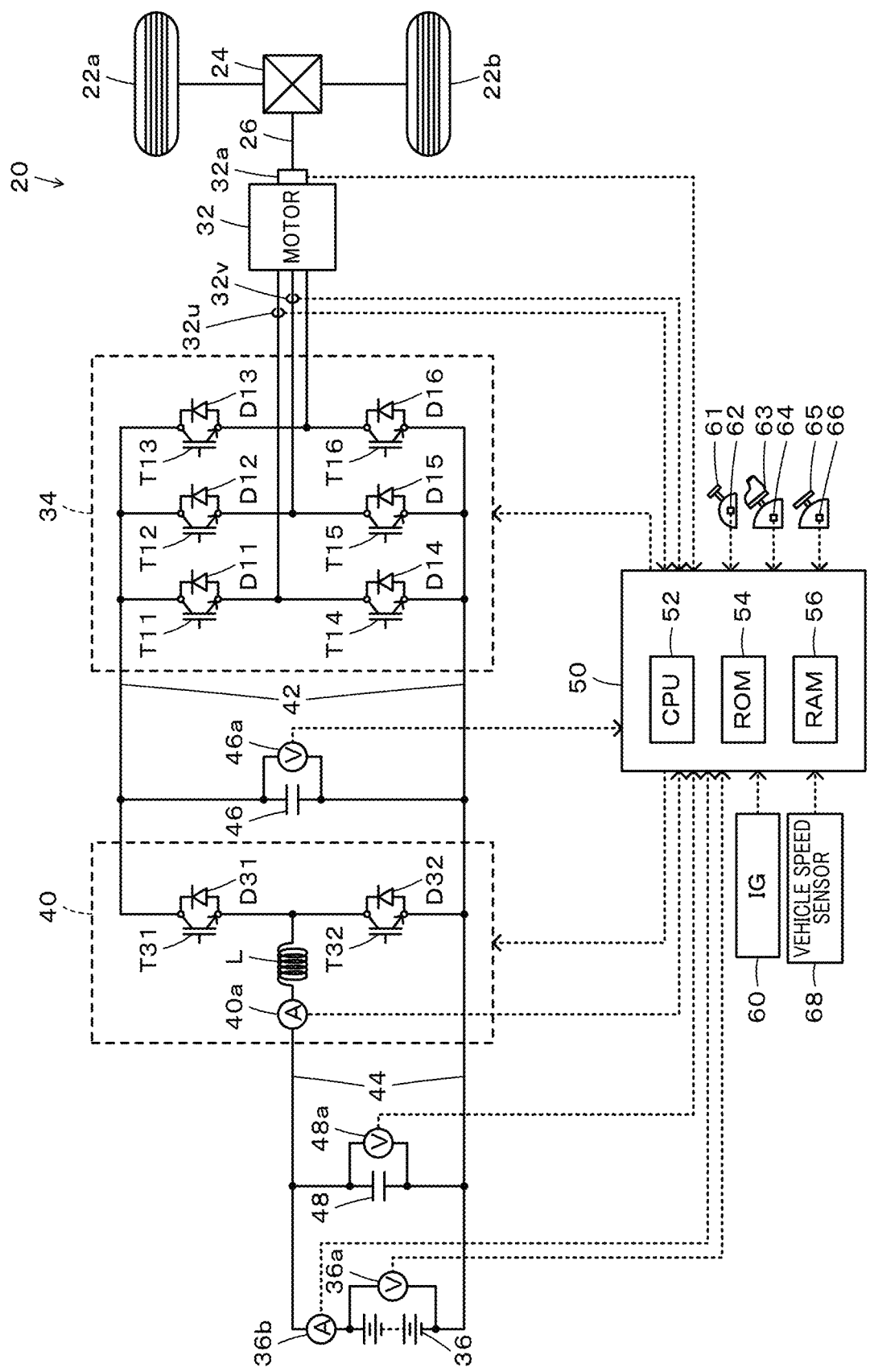
FIG. 1 is a configuration diagram illustrating the schematic configuration of an electric vehicle with a drive device according to one embodiment of the present disclosure.

The following describes aspects of the disclosure with reference to some embodiments. FIG. 1 is a configuration diagram illustrating the schematic configuration of an electric vehicle 20 with a drive device according to one embodiment of the present disclosure. The electric vehicle 20 of this embodiment includes, as shown in FIG. 1, a motor 32, an inverter 34, a battery 36 as a power source, a booster converter 40, and an electronic controller 50.

The motor 32 is configured as a synchronous generator-motor, and includes a rotor in which permanent magnets are embedded and a stator on which three-phase coils are wound. The rotor of the motor 32 is connected to a driving shaft 26 that is coupled to driving wheels 22a, 22b through a differential gear 24.

The inverter 34 is used to drive the motor 32. The inverter 34 is connected to the booster converter 40 through high voltage-side power lines 42, and has six transistors T11 to T16 as switching elements, and six diodes D11 to D16 respectively connected in parallel to the six transistors T11 to T16. The transistors T11 to T16 are disposed in pairs, with each transistor connected at a source side and a sink side respectively to a positive electrode-side line and a negative electrode-side line of the high voltage-side power lines 42. The three-phase coils (U-phase coil, V-phase coil, and W-phase coil) of the motor 32 are respectively connected to connection points of the pairs of the transistors T11 to T16. Thus, as the ratio of an "on" time of the pairs of the transistors T11 to T16 is adjusted by the electronic controller 50 while a voltage is acting on the inverter 34, a rotating magnetic field is generated in the three-phase coils and the motor 32 is driven to rotate. A smoothing capacitor 46 is mounted across the positive electrode-side line and the negative electrode-side line of the high voltage-side power lines 42.

The battery 36 is configured, for example, as a lithium-ion secondary battery or a nickel-metal hydride secondary battery, and is connected to the booster converter 40 through low voltage-side power lines 44. A smoothing capacitor 48 is mounted across a positive electrode-side line and a negative electrode-side line of the low voltage-side power lines 44.

The booster converter 40 is connected to the high voltage-side power lines 42 and the low voltage-side power lines 44, and has two transistors T31, T32, two diodes D31, D32 respectively connected in parallel to the two transistors T31, T32, and a reactor L. The transistor T31 is connected to the positive electrode-side line of the high voltage-side power lines 42. The transistor T32 is connected to the transistor T31 and to the negative electrode-side lines of the high voltage-side power lines 42 and the low voltage-side power lines 44. The reactor L is connected to a connection point between the transistors T31 and T32 and to the positive electrode-side line of the low voltage-side power lines 44. As the ratio of an "on" time of the transistors T31 and T32 is adjusted by the electronic controller 50, the booster converter 40 raises the voltage of electricity in the low voltage-side power lines 44 and supplies the electricity to the high voltage-side power lines 42, or lowers the voltage of electricity in the high voltage-side power lines 42 and supplies the electricity to the low voltage-side power lines 44.

The electronic controller 50 is configured as a microprocessor centered around a CPU 52, and includes, in addition to the CPU 52, an ROM 54 that stores processing programs, an RAM 56 that temporarily stores data, and input and output ports. Signals from various sensors are input into the electronic controller 50 through the input port. Examples of the signals input into the electronic controller 50 include a rotation position θm from a rotation position detection sensor (e.g., a resolver) 32a that detects a rotation position of the rotor of the motor 32, and phase currents Iu, Iv from current sensors 32u, 32v that detect phase currents in the respective phases of the motor 32. Other examples are a voltage (battery voltage) Vb from a voltage sensor 36a mounted across terminals of the battery 36, and a current (battery current) Ib from a current sensor 36b mounted at an output terminal of the battery 36. Further examples are a current IL from a current sensor 40a mounted in series with the reactor L, a voltage (high voltage) VH in the capacitor 46 (high voltage-side power lines 42) from a voltage sensor 46a mounted across terminals of the capacitor 46, and a voltage (low voltage) VL in the capacitor 48 (low voltage-side power lines 44) from a voltage sensor 48a mounted across terminals of the capacitor 48. Additional examples are an ignition signal from an ignition switch 60, and a shift position SP from a shift position sensor 62 that detects an operation position of a shift lever 61. Yet other examples are an accelerator operation amount Acc from an accelerator pedal position sensor 64 that detects an amount of depression of an accelerator pedal 63, a brake pedal position BP from a brake pedal position sensor 66 that detects an amount of depression of a brake pedal 65, and a vehicle speed V from a vehicle speed sensor 68. The electronic controller 50 calculates a rotation speed Nm of the motor 32 based on the rotation position θm from a rotation position detection sensor 32a, and calculates an electricity storage ratio SOC of the battery 36 based on an integrated value of the current Ib of the battery 36 from the current sensor 36b. Here, the electricity storage ratio SOC is a ratio of the amount of electricity stored in (the amount of electricity that can be discharged from) the battery 36 to the total capacity of the battery 36.

Various control signals are output from the electronic controller 50 through the output port. Examples of the signals output from the electronic controller 50 include switching control signals to the transistors T11 to T16 of the inverter 34 and switching control signals to the transistors T31, T32 of the booster converter 40.

In the electric vehicle 20 of the embodiment thus configured, the electronic controller 50 performs the following running control. In the running control, the electronic controller 50 sets a required torque Td* required by the driving shaft 26 based on the accelerator operation amount Acc and the vehicle speed V, sets the set required torque Td* as a torque command Tm* for the motor 32, and performs switching control on the transistors T11 to T16 of the inverter 34 such that the motor 32 is driven according to the torque command Tm*. Moreover, in the running control, the electronic controller 50 sets a target voltage VH* for the high voltage-side power lines 42 such that the motor 32 can be driven according to the torque command Tm*, and performs switching control on the transistors T31, T32 of the booster converter 40 such that the voltage VH in the high voltage-side power lines 42 meets the target voltage VH*.

Figure 2:
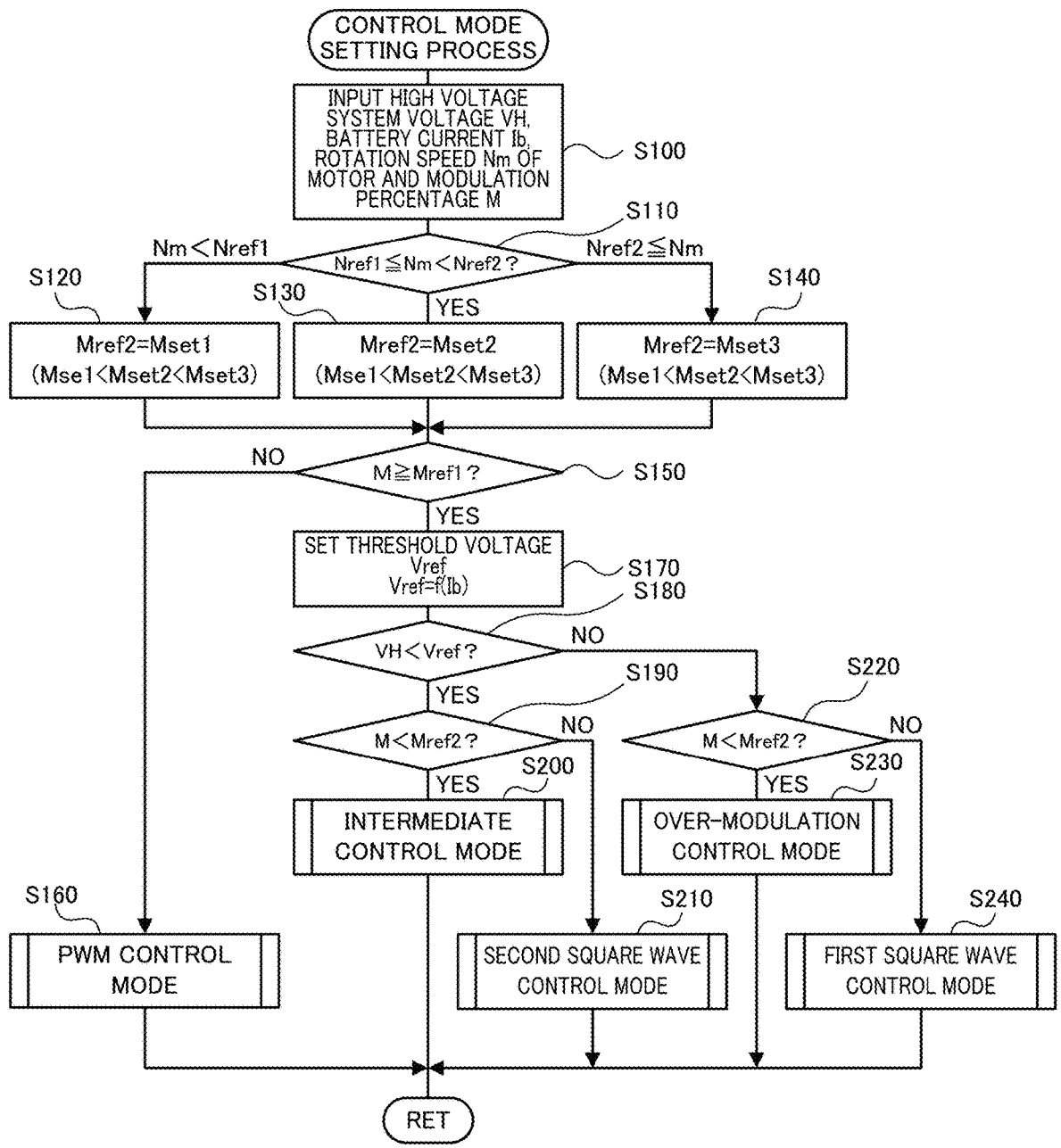
FIG. 2 is a flowchart showing an example of a control mode setting process executed by an electronic controller.

Next, the control in the controller in which the electric vehicle 20 of the embodiment is mounted, in particular, the switching control on the switching element of the inverter 34 will be described. FIG. 2 is a flowchart showing an example of a control mode setting process executed by the electronic controller 50. This process is repeatedly executed at predetermined time intervals.

When the control mode setting process is executed, the electronic controller 50 first executes a process of inputting a high voltage system voltage VH from the voltage sensor 46a, the battery current Ib from the current sensor 36b, a rotation speed Nm of the motor 32 and modulation percentage M, and the like (step S100). The rotation speed Nm of the motor 32 can be calculated and input based on the rotation position θm from the rotation position detection sensor 32a. The modulation percentage M can be obtained by dividing the square root of the sum of squares of the d-axis component Vd and the q-axis component Vq in a voltage vector by the voltage VH of the high-voltage side power lines 42.

Next, the input rotation speed Nm of the motor 32 is compared with threshold value Nref1 and threshold value Nref2 (step S110). The threshold value Nref1 and threshold value Nref2 will be described later. When the rotation speed Nm of the motor 32 is lower than the threshold value Nref1, a value Mset1 is set to the threshold value Mref2 (step S120). When the rotation speed Nm of the motor 32 is equal to or higher than the threshold value Nref1 and lower than the threshold value Nref2, a value Mset2 is set to the threshold value Mref2 (step S130). When the rotation speed Nm of the motor 32 is equal to or higher than the threshold value Nref2, a value Mset3 is set to the threshold value Mref2 (step S140). The threshold value Mref2, value Mset1, value Mset2 and value Mset3 will be described later.

Next, the modulation percentage M is compared with the threshold value Mref1 (step S150). When it is determined that the modulation percentage M is less than the threshold value Mref1, PWM control mode is set (step S160). The PWM control mode is a control mode for controlling the inverter 34 such that a pseudo three-phase AC voltage is applied (supplied) to the motor 32. When it is determined that the modulation percentage M is equal to or greater than the threshold value Mref1, a threshold voltage Vref is set based on the battery current Ib (step S170), and it is determined whether or not the high voltage system voltage VH is equal to or higher than the threshold voltage Vref (step S180). The threshold voltage Vref is predetermined as a voltage that the voltage (high voltage system voltage VH) acting on the inverter 34 does not reach 100% duty (upper arm (transistor T31) is turned on) by the swing amplitude of the feedback control amount in the boost control of the booster converter 40. In the embodiment, a relationship between the battery current Ib and the threshold voltage Vref is obtained in advance by experimentation or the like and stored as a threshold voltage setting map. The threshold voltage Vref is set by deriving the corresponding threshold voltage Vref from the map when the battery current Ib is given. Further details of the threshold voltage Vref will be described later.

Figure 4:
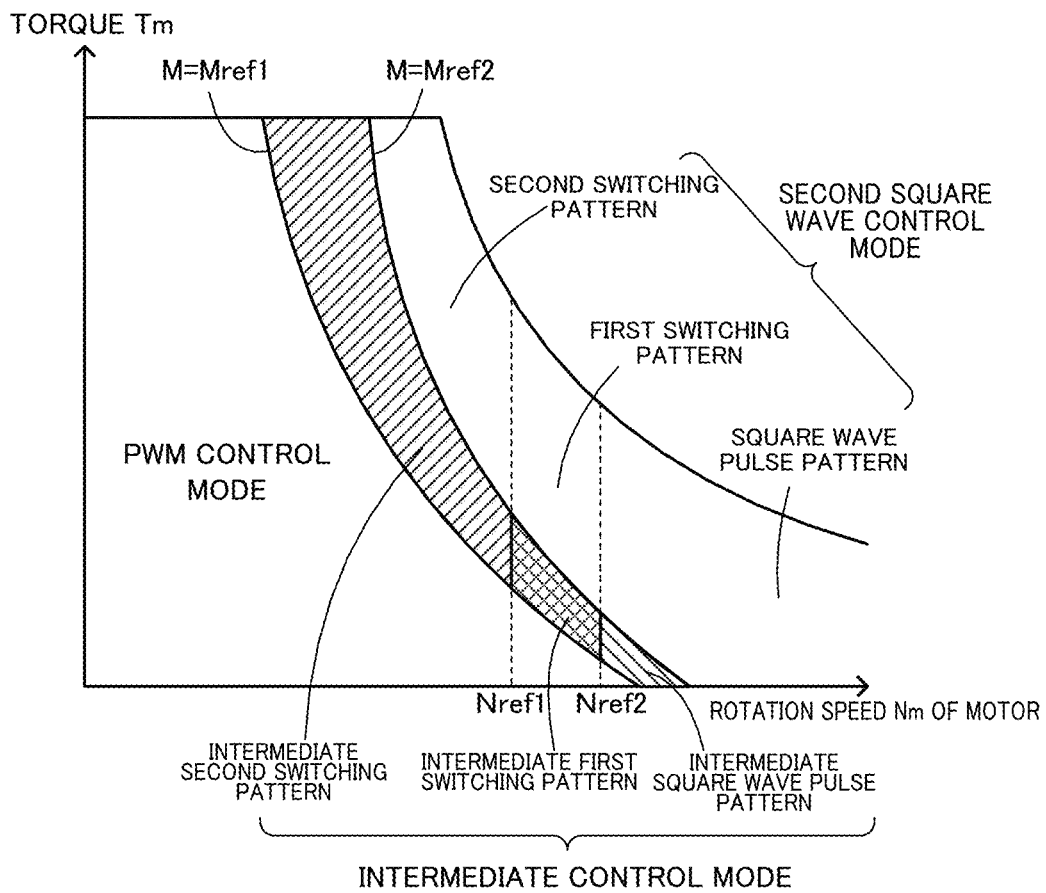
FIG. 4 is a diagram illustrating an example of a relationship between a rotation speed Nm of a motor, torque Tm and a control mode when executing second square wave control mode regardless of a high voltage system voltage VH.

When it is determined that the high voltage system voltage VH is lower than the threshold voltage Vref at step S180, the electronic controller 50 determines whether or not the modulation percentage M is less than the threshold value Mref2 (step S190). When it is determined that the modulation percentage M is less than the threshold value Mref2, an intermediate control mode is set (step S200). When it is determined that the modulation percentage M is equal to or greater than the threshold value Mref2, the second square wave control mode is set (step S210), and ends the current routine. The threshold value Mref1 is a modulation percentage for dividing the pulse-width modulation control mode (hereinafter, referred to as PWM control mode) and the intermediate control mode. The threshold value Mref2 is a modulation percentage for dividing the intermediate control mode and the second square wave control mode. The second square wave control mode is basically a control mode for controlling the inverter 34 such that a square wave voltage is applied to the motor 32. The intermediate control mode is a control performed when switching between the PWM control mode and the second square wave control mode. As the details will be described later, in the pulse pattern in the second square wave control mode, the intermediate control mode controls the inverter 34 such that the voltage of the pulse pattern forming a slit or a short pulse at the timing of zero crossing at which the phase current crosses the value 0 is applied to the motor 32. FIG. 4 is a diagram illustrating an example of a relationship between a rotation speed Nm of a motor, torque Tm and a control mode when executing second square wave control mode regardless of a high voltage system voltage VH. As shown in FIG. 4, the lower left region is the PWM control mode, the hatching region is the intermediate control mode, and the upper right region is the second square wave control mode.

The control in the PWM control mode uses a pulse pattern formed by well-known pulse width modulation, and a detailed description thereof will be omitted because it does not form the core of the present disclosure. Further, for ease of explanation, a pulse pattern in the second square wave control mode will be described first, and then a pulse pattern in the intermediate control mode will be described.

Figure 5:
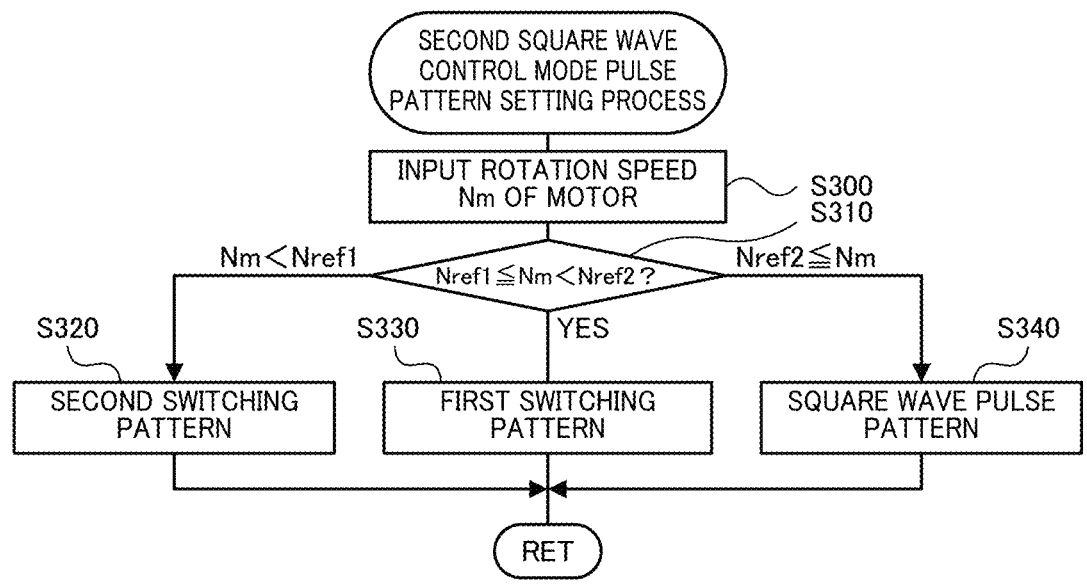
FIG. 5 is a flowchart showing an example of a square wave control mode pulse pattern setting process executed by the electronic controller.

In the controller in which the electric vehicle 20 of the embodiment is mounted, the second square wave control mode controls the inverter 34 by three pulse patterns, that is, the first switching pattern, the second switching pattern and the square wave pulse pattern. FIG. 5 is a flowchart showing an example of a second square wave control mode pulse pattern setting process executed by the electronic controller 50. In the second square wave control mode pulse pattern setting process, the electronic controller 50 inputs the rotation speed Nm of the motor 32 (step S300) and compares the input rotation speed Nm of the motor 32 with the threshold value Nref1 and Nref2 (step S310). The threshold value Nref2 is a rotation speed higher than an upper limit value of the first resonance region obtained by converting a region in which LC resonance occurs due to the electrical 6th-order fluctuation frequency of the motor 32 into the rotation speed of the motor 32. The threshold value Nref1 is a rotation speed higher than an upper limit value of the second resonance region and lower than a lower limit value of the first resonance region obtained by converting a region in which LC resonance occurs due to the electric 12th-order fluctuation frequency of the motor 32 into the rotation speed of the motor 32. When it is determined that the rotation speed Nm of the motor 32 is lower than the threshold value Nref1, the electronic controller 50 sets the second switching pattern (step S320). When it is determined that the rotation speed Nm of the motor 32 is equal to or higher than the threshold value Nref1 and lower than the threshold value Nref2, the electronic controller 50 sets the first switching pattern (step S330). When it is determined that the rotation speed Nm of the motor 32 is equal to or higher than the threshold value Nref2, the electronic controller 50 sets the square wave pulse pattern (step S340), and ends the current routine.

Figure 6:
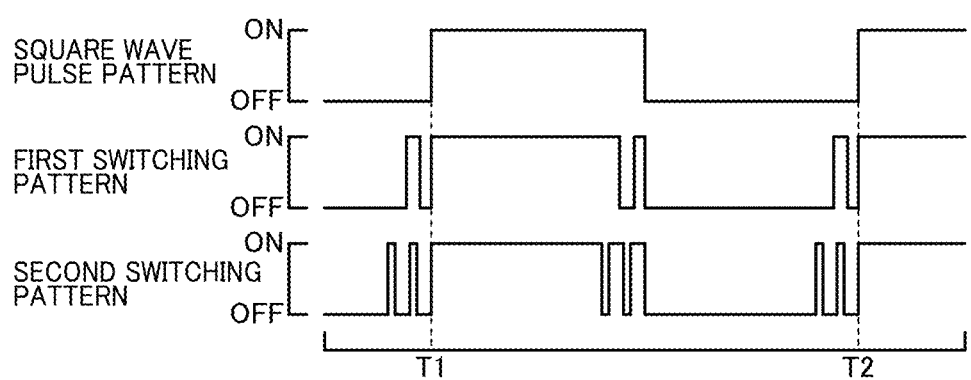
FIG. 6 is a diagram illustrating an example of a square wave pulse pattern, a first switching pattern and a second switching pattern.

FIG. 6 is a diagram illustrating an example of a square wave pulse pattern, a first switching pattern and a second switching pattern. As shown in FIG. 6, the square wave pulse pattern is a pulse pattern in which a pulse is not formed in the latter half cycle, while the entire first half cycle of one cycle of time T1 to T2 becomes one pulse (square wave pulse) (pulse pattern in normal square wave control). In the first switching pattern, one slit is formed in the region in which the square wave pulse of the square wave pulse pattern of the first half cycle of the first half cycle of the time T1 to T2 exists and one short pulse is formed at the same timing as the slit of the latter half cycle. The first switching pattern raises the frequency of the electrical 6th-order fluctuation frequency component. As a switching pattern for raising the frequency of the electrical 6th-order fluctuation frequency component, as shown in FIG. 6, not only a pulse pattern having three pulses in one cycle, but also a pulse pattern having four or more pulses in one cycle is effective. In the embodiment, however, one having the smallest number of pulses among one cycle is used as the first switching pattern. In the second switching pattern, one slit (a total of two slits) and one short pulse (a total of two short pulses) are formed in addition to the first switching pattern. The second switching pattern raises the frequency of the electric 12-order fluctuating frequency component in addition to the electric 6-order fluctuating frequency component. In the switching pattern that raises the frequency of the electrical 12-order fluctuation frequency component in addition to the electrical 6-order fluctuation frequency component, as shown in FIG. 6, not only a pulse pattern having four pulses in one cycle, but also a pulse pattern having five or more pulses in one cycle is effective. In the embodiment, however, one having the smallest number of pulses among one cycle is used as the second switching pattern. In the square wave control mode of the upper right region in FIG. 4, the second switching pattern, the first switching pattern and a square wave pulse pattern are shown in order from the left according to the region divided by the threshold value Nref1 and Nref2.

From the above description, at step S310 in the second square wave control mode pulse pattern setting process, when it is determined that the rotation speed Nm of the motor 32 is lower than the threshold value Nref1, the second switching pattern is set in order to suppress the LC resonance due to the electrical 12th-order fluctuation frequency of the motor 32. When the rotation speed Nm of the motor 32 is equal to or higher than the threshold value Nref1 and lower than the threshold value Nref2, the first switching pattern is set in order to suppress the LC resonance due to the electrical 6th-order fluctuation frequency. When the rotation speed Nm of the motor 32 is equal to or higher than the threshold value Nref2, the square wave pulse pattern is set as the LC resonance does not occur. Thus, it is possible to suppress the vibration that can be caused by the LC resonance due to the electrical 6th-order fluctuation frequency or the electric 12th-order fluctuation frequency.

Here, the significance of the value Mset1, Mset2 and Mset3 which are set to the thresholds value Mref2 at step S110-S140 of FIG. 2 will be described. The value Mset1 is a modulation percentage when the second switching pattern is used in the second square wave control mode, and 0.75 is used in the embodiment. The value Mset2 is a modulation percentage when the first switching pattern is used, and a value larger than the value Mset1, that is 0.756, is used in the embodiment. The value Mset3 is a modulation percentage when the second square wave pulse pattern is used, and a value larger than the value Mset2, that is 0.78, is used in the embodiment. As shown in FIG. 4, the threshold value Mref2 as the upper limit of the modulation percentage M of the intermediate control mode uses the modulation percentage in the second square wave control mode. Accordingly, when the rotation speed Nm of the motor 32 is lower than the threshold value Nref1, the modulation percentage becomes the value Mset1, that is the modulation percentage of using the second switching pattern. When the rotation speed Nm is equal to or higher than the threshold value Nref1 and lower than the threshold value Nref2, the modulation percentage becomes the value Mset2, that is the modulation percentage of using the first switching pattern. When the rotation speed Nm is equal to or higher than the threshold value Nref2, the modulation percentage becomes the value Mset3, that is the modulation percentage of using the square wave pulse pattern. In the process of step S110-S140 in the control mode setting process of FIG. 2, the threshold value Mref2 is set in view of this circumstance.

Figure 7:
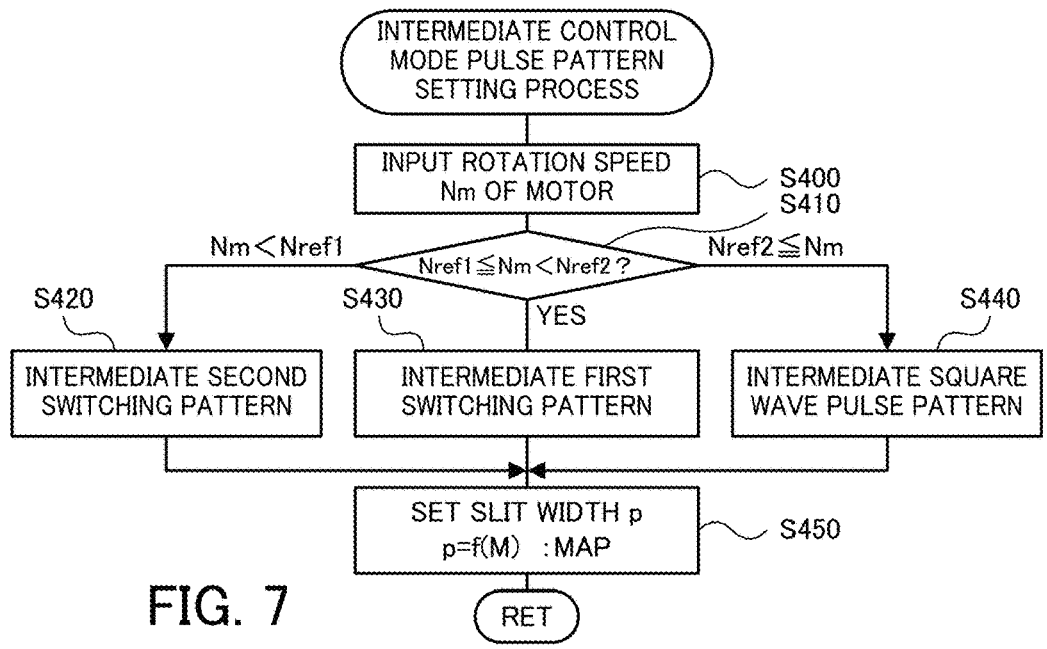
FIG. 7 is a flowchart showing an example of an intermediate control mode pulse pattern setting process executed by the electronic controller.
Figure 8:
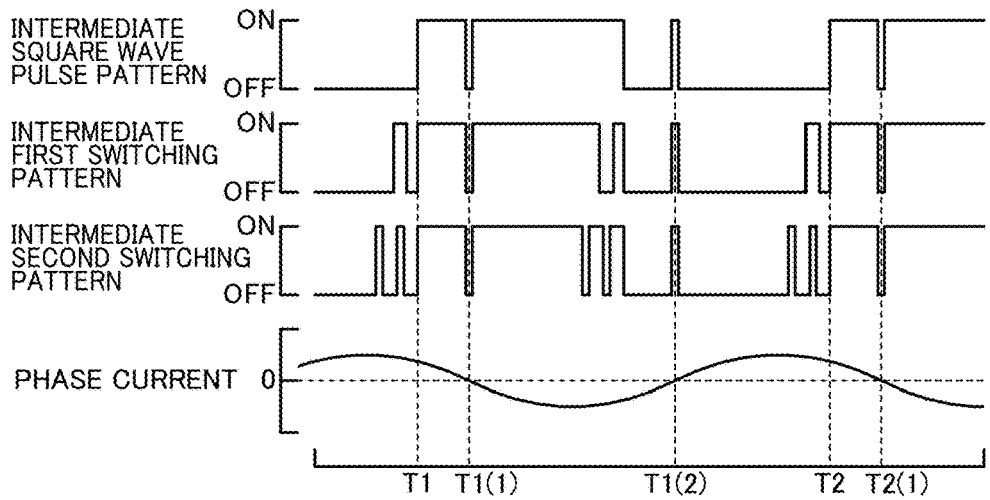
FIG. 8 is a diagram illustrating examples of an intermediate square wave pulse pattern, an intermediate first switching pattern and an intermediate second switching pattern.

Next, a pulse pattern in the intermediate control mode will be described. FIG. 7 is a flowchart showing an example of an intermediate control mode pulse pattern setting process executed by the electronic controller 50. In the intermediate control mode pulse pattern setting process, the electronic controller 50 first inputs the rotation speed Nm of the motor 32 (step S400), and compares the input rotation speed Nm of the motor 32 with the threshold value Nref1 and Nref2 (step S410). When it is determined that the rotation speed Nm of the motor 32 is lower than the threshold value Nref1, the electronic controller 50 sets intermediate second switching pattern (step S420). When it is determined that the rotation speed Nm of the motor 32 is equal to or higher than the threshold value Nref1 and lower than the threshold value Nref2, the electronic controller 50 sets intermediate first switching pattern (step S430). When it is determined that the rotation speed Nm of the motor 32 is equal to or higher than the threshold Nref2, the electronic controller 50 sets intermediate square wave pulse pattern (step S440). Examples of an intermediate square wave pulse pattern, an intermediate first switching pattern and an intermediate second switching pattern is shown in FIG. 8. In the intermediate square wave pulse pattern, with respect to the square wave pulse pattern (see FIG. 6), a slit is formed to the square wave pulse at the timing T1 (1) of zero crossing at which the phase current crosses the value 0 in the first half cycle of one cycle of time T1 to T2, and a short pulse having the same width as the slit is formed at the timing T1 (2) of the zero crossing in the latter half cycle. That is, with respect to the square wave pulse pattern, the intermediate square wave pulse pattern forms a slit when the pulse exists at the timing at which the phase current is zero crossing, and forms a short pulse having the same width as the slit when the pulse does not exist. In the intermediate first switching pattern and the intermediate second switching pattern, similarly to the intermediate square wave pulse pattern, with respect to the first switching pattern and the second switching pattern (see FIG. 6), a slit is formed to the square wave pulse at the timing T1 (1) of zero crossing in the first half cycle, and a short pulse having the same width as the slit is formed at the timing T1 (2) of the zero crossing in the latter half cycle. That is, in the intermediate first switching pattern and the intermediate second switching pattern, with respect to the first switching pattern and the second switching pattern, forms a slit when the pulse exists at the timing at which the phase current is zero crossing, and forms a short pulse having the same width as the slit when the pulse does not exist. Also, in the intermediate control mode in the hatched region of FIG. 4, the intermediate second switching pattern, the intermediate first switching pattern and the intermediate square wave pulse pattern are shown in order from the left according to the region divided by the threshold value Nref1 and Nref2.

Figure 9:
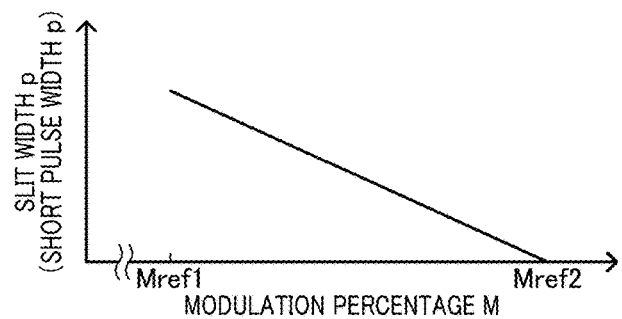
FIG. 9 is a diagram illustrating an example of a slit width setting map.

Then, the electronic controller 50 sets a slit width p based on the modulation percentage M (step S450), and ends the current routine. As described above, since the short pulse has the same width as the slit, the setting of the slit width p of step S450 is the same as the setting of the short pulse width p. In the embodiment, the slit width p, in each pulse pattern, the relationship between the pulse width p and the modulation percentage M determined by experimentation or the like such that the modulation percentage M varies from the threshold value Mref1 to the threshold value Mref2 is stored in advance as a slit width setting map. The slit width p is set by deriving the corresponding slit width from the map when the modulation percentage M is given. An example of a slit width setting map is shown in FIG. 9. As shown in FIG. 9, the slit width p becomes smaller as the modulation percentage M increases, and becomes a value 0 when the modulation percentage M reaches the threshold value Mref2. That is, when the modulation percentage M reaches the threshold value Mref2, the intermediate control mode is switched to the square wave control mode. The intermediate square wave pulse pattern, the intermediate first switching pattern and the intermediate second switching pattern are switched to the square wave pulse pattern, the first switching pattern and the second switching pattern respectively. At this time, since the slit width p gradually decreases as the modulation percentage M increases and becomes a value 0, the torque fluctuation does not occur when switching from the intermediate control mode to the square wave control mode. Furthermore, we assume that a slit or short pulse at the timing of zero crossing of the phase current are formed to reduce the influence of the phase current on the waveform.

Figure 10:
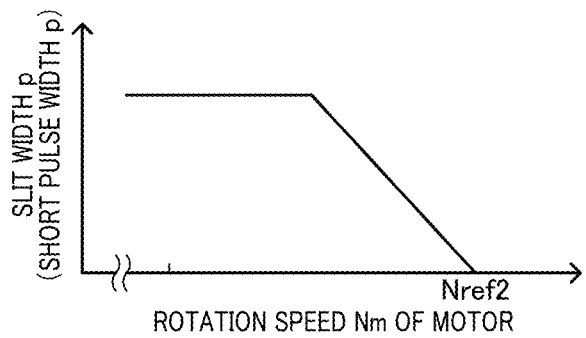
FIG. 10 is a diagram illustrating an example of a relationship between the rotation speed Nm and the width p of the slit and short pulse of the first switching pattern.

Next, the operation when switching from the first switching pattern to the square wave pulse pattern, that is, the operation when the rotation speed Nm of the motor 32 is increased beyond the threshold value Nref2 in FIG. 4 will be described. When the rotation speed Nm of the motor 32 reaches the vicinity of the threshold value Nref2, the width p of the slit and short pulse of the first switching pattern shown in FIG. 6 is gradually decreased. An example of a relationship between the rotation speed Nm and the width p of the slit and short pulse of the first switching pattern is shown in FIG. 10. When the rotation speed Nm of the motor 32 reaches the threshold value Nref2, the width p of the slit and short pulse becomes value 0, and switches from the first switching pattern to the square wave pulse pattern. In practice, however, since the dead time exists, the width p of the slit and short pulse does not change linearly and change abruptly by the dead time width. Therefore, when switching from the first switching pattern to the square wave pulse pattern, a voltage step corresponding to the dead time width is generated and a slight torque fluctuation occurs. Also, the same torque fluctuation occurs when switching from the second switching pattern to the first switching pattern. When the rotation speed Nm of the motor 32 reaches the vicinity of the threshold value Nref2, the switching from the second switching pattern to the first switching pattern is performed by gradually reducing the width of the slit or the short pulse that does not exist in the first switching pattern in the second switching pattern shown in FIG. 6. Therefore, when the width of the slit or short pulse is set to value 0, a voltage step corresponding to the dead time width occurs and a slight torque fluctuation occurs.

Figure 11:
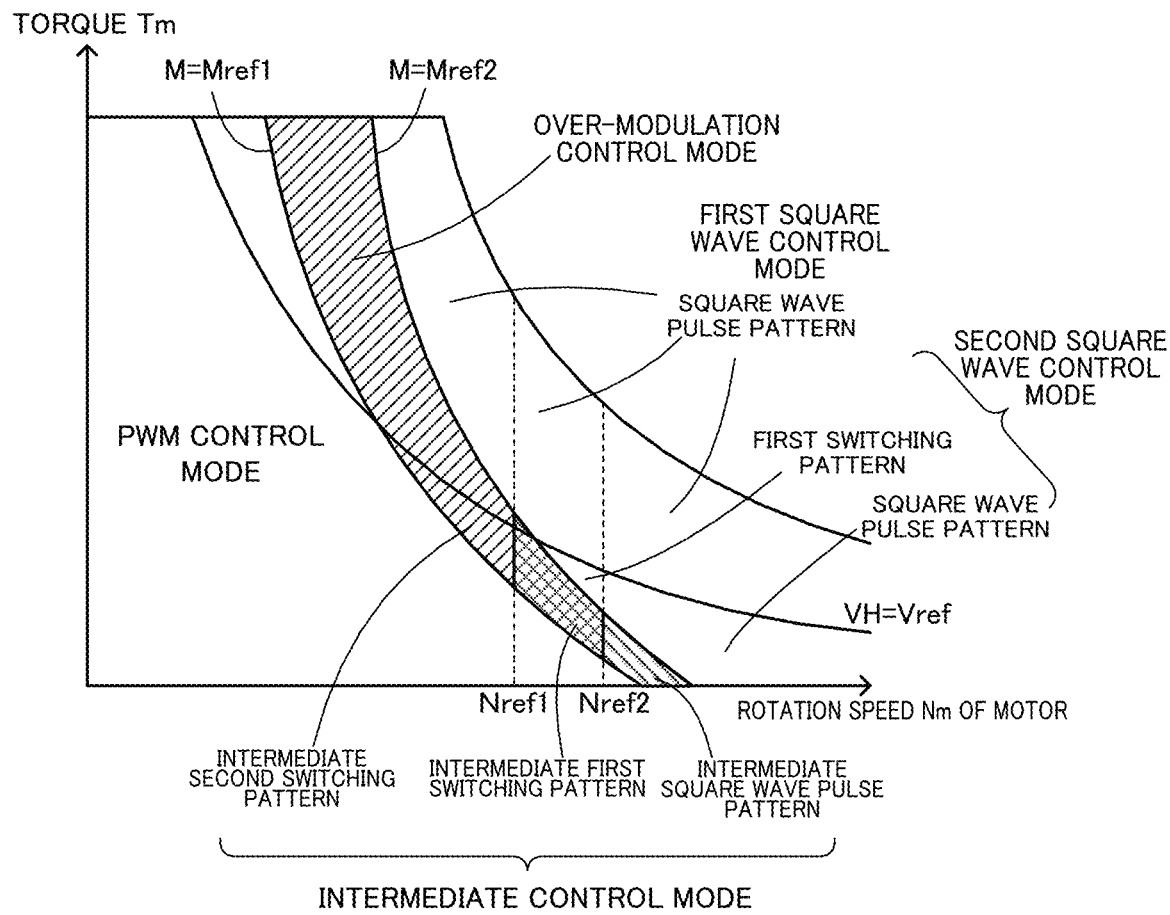
FIG. 11 is a diagram illustrating an example of a relationship between the high voltage system voltage VH, the rotation speed Nm of the motor, the torque Tm and the control mode.

Here, it returns to the description of the control mode setting process in FIG. 2. When it is determined that the high voltage system voltage VH at step S180 is equal to or higher than the threshold voltage Vref, the electronic controller 50 determines whether or not the modulation percentage M is lower than the threshold value Mref2 (step S220). When it is determined that the modulation percentage M is lower than the threshold value Mref2, the electronic controller 50 sets over-modulation control mode (step S230). When it is determined that the modulation percentage M is equal to or higher than the threshold value Mref2, the electronic controller 50 sets the first square wave control mode (step S240), and ends the current routine. In this case, the threshold value Mref1 is a modulation percentage for dividing the PWM control mode and the over-modulation control mode. The threshold value Mref2 is a modulation percentage for dividing the over-modulation control mode and the first square wave control mode. The first square wave control mode is a control mode using a square wave pulse pattern. The over-modulation control mode is a control mode for setting on and off of the switching element using a triangle wave in the same manner as the PWM control for the modulation percentage M that exceeds the PWM control region. FIG. 11 is a diagram illustrating an example of a relationship between the high voltage system voltage VH, the rotation speed Nm of the motor, the torque Tm and the control mode. In the region above the VH=Vref of FIG. 11, the left region shows the PWM control mode, the hatched region shows the over-modulation control mode, and the right region of the over-modulation control mode shows the first square wave control mode. In the region below the VH=Vref, the PWM control mode, the intermediate control mode and the second square wave control mode are switched as described above. As can be seen by comparing FIG. 11 and FIG. 4, in FIG. 11, the first switching pattern and the square wave pulse pattern exist, and the second switching pattern does not exist in the second square wave control mode. However, the second switching pattern can exist depending on the position of the VH=Vref curve. The position of the VH=Vref curve is determined by the design of the feedback control in the circuit or duty control.

In the first square wave control mode, a square wave pulse pattern is used in all the square wave region where the modulation percentage M is equal to or higher than the threshold value Mref2. Therefore, the switching from the first switching pattern to the square wave pulse pattern or switching from the second switching pattern to the first switching pattern is not performed. Therefore, in the first square wave control mode, the torque fluctuation due to the voltage step corresponding to the dead time width at the time of switching from the first switching pattern to the square wave pulse pattern or the switching from the second switching pattern to the first switching pattern does not occur. Since the first switching pattern and the second switching pattern is intended to suppress the LC resonance in the first resonance region or the second resonance region, LC resonance may occur in the first square wave control mode. In the first square wave control mode, however, it is assumed that LC resonance does not occur by setting the high voltage system voltage VH in the range equal to or higher than the threshold voltage Vref. The reason why LC resonance does not occur will be explained below.

Figure 3:
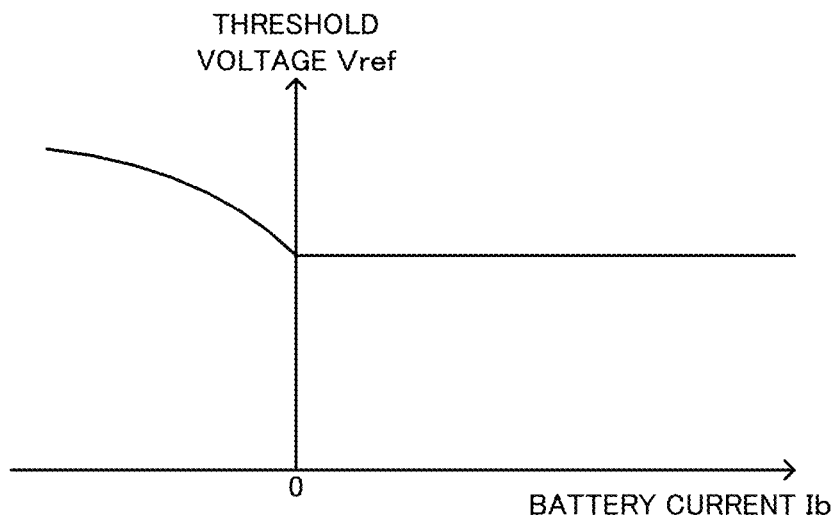
FIG. 3 is a diagram illustrating an example of a threshold voltage setting map.
Figure 12:
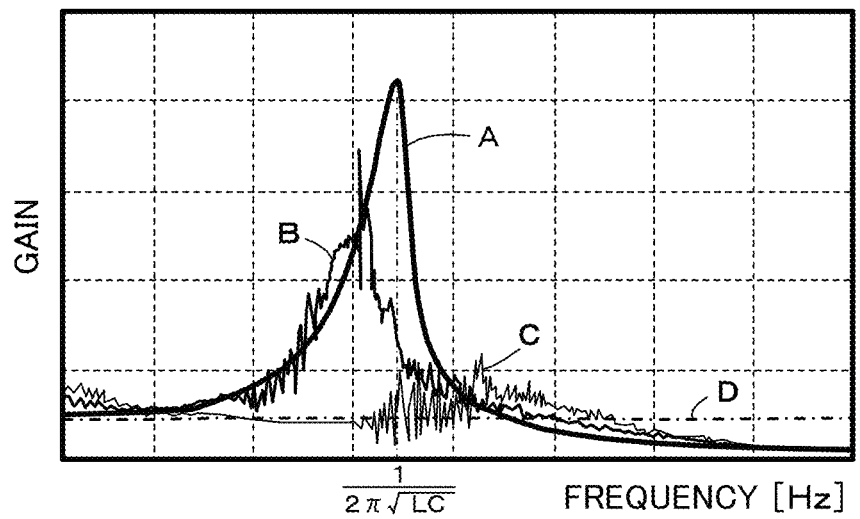
FIG. 12 is a diagram illustrating an example of a bode plot when the transfer function C(s) is changed.
Figure 13:
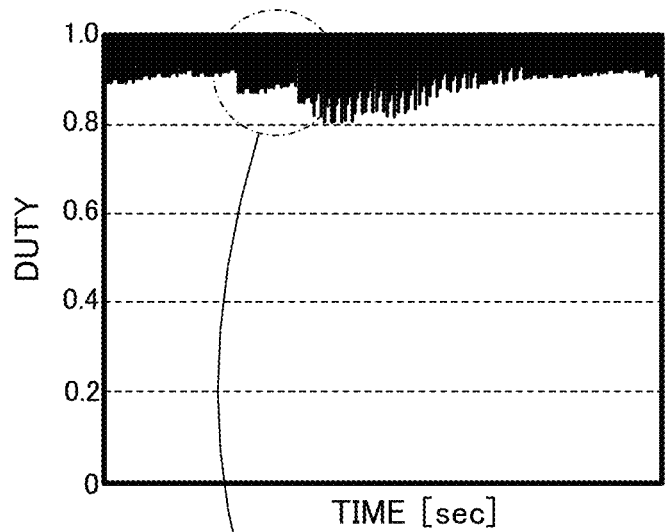
FIG. 13 is a diagram illustrating an example of a time change and an enlargement of a part of the time change of the actual duty when the duty as a command value is slightly smaller than 100%.
Figure 13:
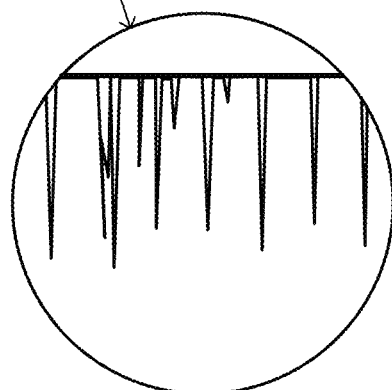

The battery current Ib and the current Iload flowing through the inverter 40 is expressed by the following equation (1), where G (s) is the transfer function of the circuit due to the inductance or the capacitor, and C (s) is the transfer function of the control of the booster converter 40. Since the characteristic of the transfer function C (s) can be adjusted by adjusting the control gain of the booster converter 40, LC resonance can be avoided by designing the gain such that the cutoff frequency of the transfer function C (s) becomes smaller than the LC resonance frequency. The transfer function C (s) becomes value 1 when the voltage is not raised at all by the booster converter 40, that is, when the transistor T31 (upper arm) of the booster converter 40 is always on (duty is 100%). The battery current Ib depends only on the transfer function G (s) with respect to the current Iload. The duty is expressed by equation (2). The duty becomes 100% when the voltage is not raised at all by the booster converter 40 (the upper arm is always on), and the high voltage system voltage VH increases as the duty decreases. In equation (2), Vb is the battery voltage, Rb is the internal resistance of the battery 36, Ib is the battery current, and VH is the high voltage system voltage. FIG. 12 is a diagram illustrating an example of a bode plot when the transfer function C(s) is changed. In FIG. 12, curve A of the thick solid line shows the case where the duty is 100% (when the transfer function C(s) is value 1), curve B of the solid line shows the case where the duty is slightly smaller than 100%, curve C of the thin solid line shows the case where the duty is even smaller than the curve B, and curve D of the dot-dash line shows the case where the duty is even further smaller than the curve C. The peak of the curve A is the LC resonance frequency $(1/\{2\pi(LC)1/2\})$. The reason LC resonance occurs even when the duty is smaller than 100% is that the feedback control is performed in the duty control and the frequency at which the duty becomes 100% is increased by the swing amplitude of the feedback control. FIG. 13 is a diagram illustrating an example of a time change and an enlargement of a part of the time change of the actual duty when the duty as a command value is slightly smaller than 100%. In the embodiment, by setting the high voltage system voltage VH when the duty does not become 100% due to the swing amplitude of the feedback control as the threshold voltage Vref, the cutoff frequency of the transfer function C(s) becomes smaller than the LC resonance frequency to avoid the LC resonance. As shown in FIG. 3, when the battery current Ib is a positive value (when driving and controlling the motor 32), the threshold voltage Vref becomes constant. When the battery current Ib is a negative value (when charging the battery 36 by regeneratively controlling the motor 32), the threshold voltage Vref becomes higher compared to when the battery current Ib is the positive value.

$$Ib = G(s) \cdot C(s) \cdot Iload \quad (1)$$

$$Duty = (Vb - Rb \cdot Ib)/VH \quad (2)$$

In the drive device of the embodiment in which the electric vehicle 20 is mounted described above, when the booster converter 40 is controlled such that the high voltage system voltage VH is equal to or higher than the threshold voltage Vref, the pulse-width modulation control mode and the over-modulation control mode and the first square wave control mode are switched according to the modulation percentage by using the first square wave control mode using the square wave pulse pattern. Since only the square wave pulse pattern is used in the first square wave control mode, the first switching pattern and the square wave pulse pattern are not switched as in the second square wave control mode. Therefore, the torque fluctuation due to the voltage step corresponding to the dead time width at the time of switching from the first switching pattern to the square wave pulse pattern does not occur. Moreover, since the high voltage system voltage VH when the duty is not 100% due to the swing amplitude of the feedback control is set as the threshold voltage Vref, the cutoff frequency of the transfer function C(s) can be smaller than the LC resonance frequency, thereby avoiding the LC resonance. When the booster converter 40 is controlled such that the high voltage system voltage VH is lower than the threshold voltage Vref, the pulse-width modulation control mode, the intermediate control mode and the second square wave control mode are switched according to the modulation percentage by using the second square wave control mode using the first switching pattern, the second switching pattern and the square wave pulse pattern. This suppresses the LC resonance, although slight torque fluctuation occurs when switching from the first switching pattern to the square wave pulse pattern. As a result, as a whole, the torque fluctuation that may occur when switching from the switching pattern for suppressing the LC resonance in the resonance region in the square wave control to the square wave pulse pattern can be suppressed.

In the drive device of the embodiment in which the electric vehicle 20 is mounted, the first square wave control mode is used when the booster converter 40 is controlled such that the high voltage system voltage VH is equal to or higher than the threshold voltage Vref. The second square wave control mode is used when the booster converter 40 is controlled such that the high voltage system voltage VH is less than the threshold voltage Vref. However, the first square wave control mode may be used when the duty of the booster converter 40 is less than the threshold duty, and the second square wave control mode may be used when the duty of the booster converter 40 is equal to or more than the threshold duty. In this case, a duty that does not become 100% due to the swing amplitude of the feedback control in the duty control may be used as the threshold duty.

In the drive device of the embodiment in which the electric vehicle 20 is mounted, even in the intermediate first switching pattern or the intermediate second switching pattern, a slit is formed when the pulse exists at the timing at which the phase current is zero crossing, and a short pulse having the same width as the slit is formed when the pulse does not exist. The width of the slit and the short pulse at the timing of zero crossing is changed by the modulation percentage M. However, in the first switching pattern or the second switching pattern, the one that changes the width of the slit or short pulse by the modulation percentage M may be defined as the intermediate first switching pattern or the intermediate second switching pattern.

In the drive device of the embodiment in which the electric vehicle 20 is mounted, the first switching pattern and the second switching pattern are used in the second square wave control mode. However, only the first switching pattern or only the second switching pattern may be used.

The embodiment describes the present disclosure with the aspect of the drive device in which the electric vehicle 20 is mounted, however, the drive device may be mounted on a hybrid vehicle or any moving body other than motor vehicle.

In the drive device of this aspect, the threshold voltage, when the booster converter is controlled by a duty control with a feedback control may be predetermined with respect to a current from the electricity storage device as a voltage whose duty does not reach 100% due to a swing amplitude by the feedback control. When the duty is 100%, that is, when the voltage is not raised at all by the booster converter, the transfer function of the booster converter control becomes value 1 and the transfer function depends only on the transfer function of the circuit. Accordingly, when the duty becomes 100% frequently due to the swing amplitude of the feedback control, the transfer function depends on the transfer function of the circuit more frequently, and LC resonance occurs in the resonance region. Therefore, by avoiding the duty from becoming 100% due to the swing amplitude by the feedback control, the transfer function of the booster converter control can be reflected in the transfer function, and the LC resonance in the resonance region can be avoided. In this case, the controller may use a duty that does not reach 100% due to the swing amplitude by the feedback control as the threshold voltage. That is, the controller may use a duty instead of the voltage acting on the inverter.

Further, in the drive device of this aspect, the controller may switch between the pulse-width modulation control mode and the first square wave control mode via an over-modulation region according to a modulation percentage when the booster converter is controlled such that a voltage acting on the inverter becomes equal to or higher than a threshold voltage. The controller may switch between the pulse-width modulation control mode and the second square wave control mode via an intermediate region that changes the width of the slit and the short pulse in the first switching pattern according to a modulation percentage when the booster converter is controlled such that a voltage acting on the inverter becomes lower than the threshold voltage.

In the drive device of this aspect, the second square wave control mode may be a mode using a second switching pattern when a rotation speed of the motor is lower than a second predetermined rotation speed that is lower than the first predetermined rotation speed. The second switching pattern may be a pattern in which a number of slits and a number of short pulses is larger than the first switching pattern. The second switching pattern may suppress a LC resonance in a second resonance region that is included in a rotation speed region that is lower than the second rotation speed. In this way, the LC resonance in the second resonance region can also be suppressed.

The following describes the correspondence relationship between the primary components of the embodiment and the primary components of the disclosure described in Summary. The battery 36 of the embodiment corresponds to the "electricity storage device", the motor 32 corresponds to the "motor", the inverter 34 corresponds to the "inverter", the boost converter 40 corresponds to the "boost converter" and the electronic controller 50 corresponds to the "controller".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The technique of the disclosure is preferably applicable to the manufacturing industries of the drive device and so on.

The invention claimed is:

1. A drive device, comprising:
an electricity storage device;
a motor;
an inverter that drives the motor;
a booster converter being installed between the electricity storage device and the inverter; and
a controller that performs switching control on a switching element of the inverter and controls the booster converter,
wherein
for the switching control on the switching element of the inverter,
the controller is programmed to switch between a pulse-width modulation control mode and a first square wave control mode according to a modulation percentage when the booster converter is controlled such that a voltage acting on the inverter becomes equal to or higher than a threshold voltage that is based on an electricity from the electricity storage device,
the controller is programmed to switch between the pulse-width modulation control mode and a second square wave control mode according to a modulation percentage when the booster converter is controlled such that a voltage acting on the inverter becomes lower than the threshold voltage, and
the first square wave control mode is a mode using a square wave pulse pattern in which a first half cycle or a latter half cycle of each cycle is a square wave pulse,
the second square wave control mode is a mode using the square wave pulse pattern when a rotation speed of the motor is equal to or higher than a first predetermined rotation speed that is higher than a first resonance region,
the second square wave control mode is a mode using a first switching pattern when a rotation speed of the motor is lower than the first predetermined rotation speed,
the first switching pattern forms one or more slits in a region where a square wave pulse in the square wave pulse pattern exists,
the first switching pattern forms a short pulse having a same width as the slit at a same timing as the slit in a region where no square wave pulse exists,
the first switching pattern suppresses a LC resonance in the first resonance region.

2. The drive device according to claim 1,
wherein the threshold voltage, when the booster converter is controlled by a duty control with a feedback control, is predetermined with respect to a current from the electricity storage device as a voltage whose duty does not reach 100% due to a swing amplitude by the feedback control.

3. The drive device according to claim 2,
wherein the controller uses a duty that does not reach 100% due to the swing amplitude by the feedback control as the threshold voltage.

4. The drive device according to claim 1,
wherein the controller switches between the pulse-width modulation control mode and the first square wave control mode via an over-modulation region according to a modulation percentage when the booster converter is controlled such that a voltage acting on the inverter becomes equal to or higher than a threshold voltage, and
the controller switches between the pulse-width modulation control mode and the second square wave control mode via an intermediate region that changes the width of the slit and the short pulse in the first switching pattern according to a modulation percentage when the booster converter is controlled such that a voltage acting on the inverter becomes lower than the threshold voltage.

5. The drive device according to claim 1,
wherein the second square wave control mode is a mode using a second switching pattern when a rotation speed of the motor is lower than a second predetermined rotation speed that is lower than the first predetermined rotation speed, the second switching pattern is a pattern in which a number of slits and a number of short pulses is larger than the first switching pattern,
the second switching pattern suppresses a LC resonance in a second resonance region that is included in a rotation speed region that is lower than the second rotation speed.

* * * * *